United States Patent Office 2,858,164
Patented Oct. 28, 1958

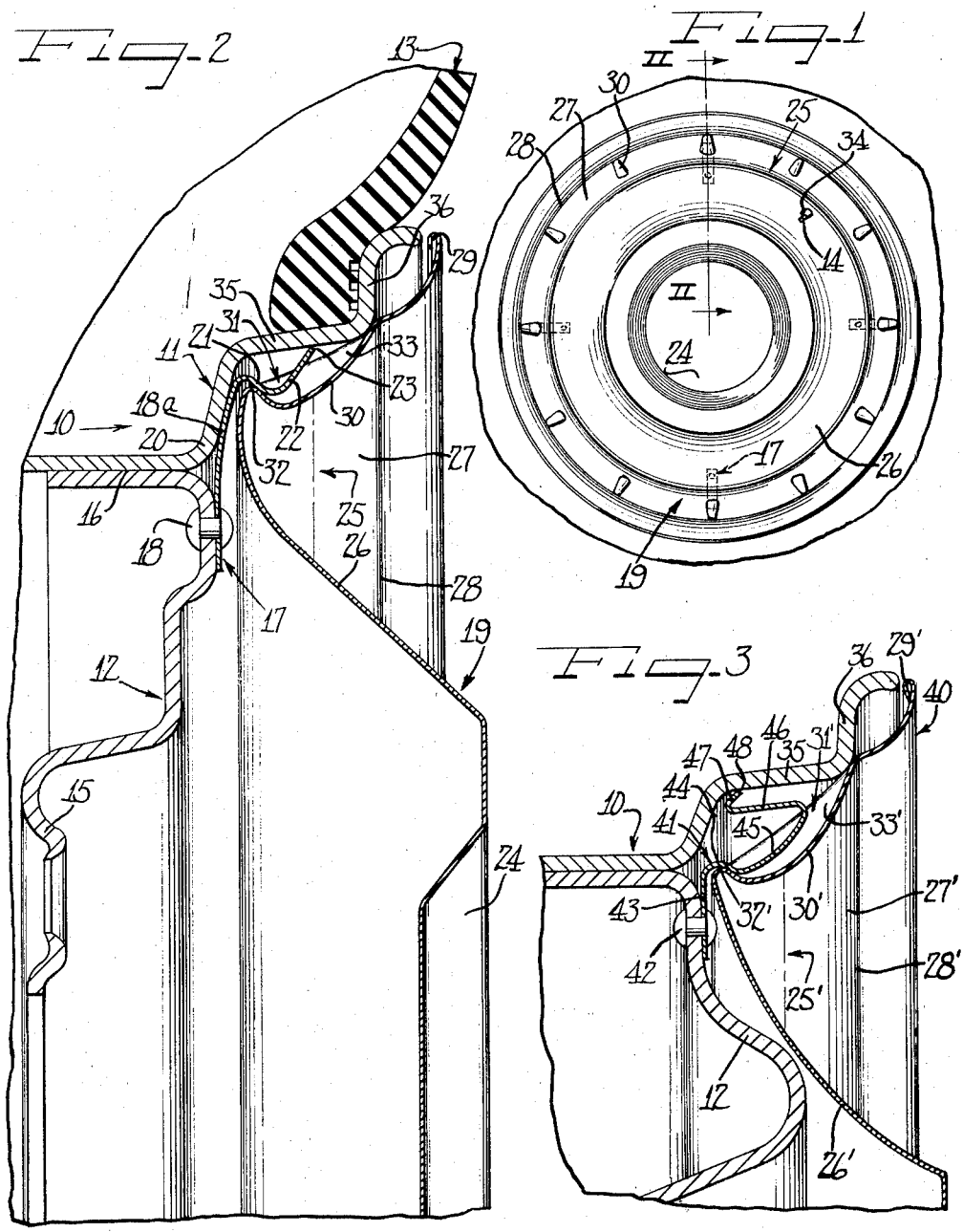

2,858,164

WHEEL COVER

George Albert Lyon, Detroit, Mich.

Application January 3, 1956, Serial No. 556,863

12 Claims. (Cl. 301—37)

This invention relates to a wheel structure and more particularly to a new and improved retaining means cooperable with a new and improved cover construction to give a new and improved co-operation between the wheel, retaining means, and cover.

An object of this invention is to provide a new and improved cover construction which may be readily maintained upon a vehicle wheel and which has a highly ornamental and attractive appearance.

Another object of this invention is to provide new and improved retaining means to hold the cover upon the wheel.

Still another object of this invention is to provide a new and improved interaction between the wheel, retaining means, and cover.

Still another object of this invention is to provide a deeply drawn cover construction having circumferentially spaced utilitarian and ornamental pressed out portions defining rearwardly opening pockets.

Yet another object of this invention is to provide a new and improved wheel structure including retaining means and cover which lend themselves to economical manufacture on a large production basis.

According to the general feature of this invention there is provided in a wheel structure including rim and body parts with one of the parts having circumferentially spaced generally radially outwardly extending clips, each including a resilient deflectable shouldered cover retaining portion, an interlocking portion, and a terminal to bear against said tire rim to cushion and back-up the shouldered portion, a wheel cover in overlying disposition of the wheel and having an annular dished portion including a radially outer annular flange portion having circumferentially spaced pressed out portions providing rearwardly opening pockets, said pockets each having adjacent thereto a retaining shoulder positioned in a common circle relative to one another, each capable of cooperation with at least one of said resiliently deflectable shouldered cover retaining clip portions to maintain the cover on the wheel, at least one of the interlocking portions lodged in one of said pockets to insure co-rotation, and each of said clip terminals bearing against said tire rim to cushion and back-up said shouldered clip portion.

Other objects, features and advantages of the present invention will more fully become apparent from the following detailed description taken in conjunction with the accompanying drawing illustrating several embodiments thereof and in which:

Figure 1 is a side elevation of my wheel structure in full and dotted lines showing the ornamental and utilitarian characteristics of my cover construction;

Figure 2 is an enlarged fragmentary cross sectional view taken substantially on the line II—II of Figure 1 looking in the direction indicated by the arrows; and Figure 3 is an enlarged fragmentary cross sectional view similar to Figure 2 only illustrating a modified form of my invention.

As shown on the drawing:

The reference numeral 10 indicates generally a wheel including rim and body parts 11 and 12 which are more or less of a conventional construction. Carried upon the tire rim, which is of a multi-flanged drop center type, is a tire assembly 13 which may be either of the tube or tubeless type having a valve stem (Figure 1) 14 for inflating the tire.

The body part 12 has a central bolt on flange 15 which may be secured to an axle of a wheel by bolts in a customary manner. The rim and body parts 11 and 12 are suitably connected together at 16. Adjacent the connection of the wheel parts are disposed circumferentially spaced retaining clips 17 which are riveted at 18 to the the body part 12.

The clip 17 includes a relatively long generally axially outwardly extending leg or attachment portion 18a which when in retaining engagement with a wheel cover 19 is bottomed against a generally radially outwardly extending tire rim flange 20. Connected to the clip flange 18a at its radially outer end is a generally radially inwardly and axially outwardly extending shoulder portion 21. The shoulder portion 21 is in turn connected at its axially outer end to a generally radially and axially outwardly extending inter-locking flange portion 22 terminating in a gripping biting edge 23.

It will be appriciated that the clips may be made out of any suitable material and that excellent results may be attained through the making of the clips of resilient steel or the like.

The cover 19 is of the type that may be drawn from a single strip of metal which is preferably stainless steel or some other similar material which lends itself to being polished thereby providing a highly lustrous and attractive finish. It will be appreciated that since the clips 17 are made separate and apart from the cover, that the cover may be made from other suitable materials to enable different finishes to be attained.

The cover 19 has a relative large dished central crown 24. Disposed radially outwardly of the central crown 24 is a deeply drawn and dished annular cover portion 25 which includes annular converging flange portions 26 and 27; cover portion 26 extending generally axially inwardly radially outwardly and cover portion 27 extending generally axially and radially inwardly. Annular cover portion 27 in fact is a part of the outer margin of the cover. Intermediate the outer margin and flange 27 is an annular intermediate back-up and reinforcing rib 28. It will be noted that the outer marginal cover portion 27 completely overlies the tire rim 11 and terminates in an underturned pry-off bead 29 behind which wheel balancing weights may be concealed.

Positioned in a circumferentially spaced manner about the flange portion 27 are a plurality of pressed out bumplike portions 30 which define on their inner side pockets 31.

These pockets 31 are arranged in a common circle and are defined on their generally axially inner side by a shouldered portion 32. Each of the pressed out portions 30 has side walls 33—33 which act as stops when the cover is assembled on the wheel cooperating with interlocking portion 22 to insure co-rotation of the cover with the wheel.

The cover may be assembled on the wheel by initially centering same with respect thereto and thereafter tentatively engaging the shouldered portions 32, which are also arranged in a common circle, against the interlocking or lead-in clip portions 22 and upon the application of a further force the cover is urged axially inward over and behind and into retaining engagement with the clip shoulders 21.

It will be appreciated that by aligning the valve stem 14 with respect to an opening 34 in the cover, the clips and intended retaining shoulder portions 32 on the cover are placed in proper alignment.

It will be appreciated that any suitable number of clips may be employed on the wheel. In addition, it will be noted that 12 pressed out portions 30 have been utilized and this number may be varied as desired.

When the cover is in full engagement upon the wheel the clip edges 23 are resiliently deflected into biting gripping engagement with rim flange 35 thereby serving to back-up, reinforce and cushion the retaining engagement between the clips and cover. For purposes of stabilizing and reinforcing the cover on the wheel the annular rib 28 is bottomed against the junction of rim flanges 35 and 36.

Removal of the cover from the wheel may be brought about by inserting a suitable pry-off tool underneath the bead 39 and progressively working same until the tip of the tool engages against rib 28 whereupon the cover may be readily disengaged from the clips 17.

In Figure 3 is shown a modified form of my invention and where generally similar elements have been employed the numbers are the same or have been primed.

In this form of my invention a cover 40 is adapted to be retainingly maintained on wheel 10 by means of retaining clips 41 which are riveted at 42 to the wheel body part 12.

In this instance the clips 41 are more or less of a gooseneck construction and include an attachment portion 43, a shouldered cover retaining portion 44, an interlocking lead-in portion 45, a generally axially extending flange portion 46 terminating in a reverse bent generally radially and axially outwardly extending terminal flange portion 47. The terminal portion 47 has on its outer end a gripping biting edge 48.

The cover 40 is of substantially the same construction as the cover 19 in the first form of my invention although, the proportions have been varied slightly. Accordingly, primed numerals have been used to identify corresponding cover portions. To assemble the cover on the wheel, the cover is first centered so that at least certain of the pockets 31' are aligned with the spring clip 41. The cover is then pressed axially inwardly with the retaining shoulder 32', which is disposed on the inner side of pocket 31', being engaged against interlocking or lead-in portion 45. Upon the application of a further inward force the shouldered portion 32' is snapped behind into detachable cover retaining engagement with the resiliently deflectable shouldered cover retaining portion 44.

After assembly has been completed it will be noted that the edge 48 is again in biting gripping engagement with rim flange 35 to back up and cushion the engagement between the cover and clips. Still further, it will again be noted that the rib 28' is bottomed against the junction of the rib flanges 35 and 36 to back-up and rigidify the cover and in addition stabilize the cover in assembly on the wheel.

To effect removal of the cover 40 in the modified form of my invention a suitable pry-off tool may be again slipped under bead 39' until the tip is engaged against rib 28' and upon further working of the tool the cover may be disengaged from the clips.

It will be understood that modifications and variations may be effected without departing from the scope of the novel concepts of the present invention.

I claim as my invention:

1. In a wheel structure including rim and body parts with one of the parts having circumferentially spaced generally radially outwardly extending clips, each including a resilient deflectable shouldered cover retaining portion, an interlocking portion, and a terminal to bear against said tire rim to cushion and back-up the shouldered portion, a wheel cover in overlying disposition of the wheel and having an annular dished portion including a radially outer annular flange portion having circumferentially spaced pressed out portions providing rearwardly opening pockets, said pockets each having adjacent thereto a retaining shoulder positioned in a common circle relative to one another, each capable of cooperation with at least one of said resiliently deflectable shouldered cover retaining clip portions to maintain the cover on the wheel, at least one of the interlocking portions being lodged in one of said pockets to insure co-rotation, and each of said clip terminals bearing against said tire rim to cushion and back-up said shouldered clip portion.

2. In a wheel structure including rim and body parts with one of the parts having circumferentially spaced generally radially outwardly extending clips, each including a resilient deflectable shouldered cover retaining portion, an interlocking portion, and a terminal to bear against said tire rim to cushion and back-up the shouldered portions, a wheel cover in overlying disposition of the wheel and having an annular dished portion including a radially outer annular flange portion having circumferentially spaced pressed out portions providing rearwardly opening pockets, said pockets each having adjacent thereto a retaining shoulder positioned in a common circle relative to one another, each capable of cooperation with at least one of said resiliently deflectable shouldered cover retaining clip portions to maintain the cover on the wheel, at least one of the interlocking portions being lodged in one of said pockets to insure co-rotation, and each of said clip terminals bearing against said tire rim to cushion and back-up said shouldered clip portion, each of said pressed out portions extending generally radially inwardly with said retaining shoulder at an axially inner side of each of said pressed out portions.

3. In a wheel structure including rim and body parts with one of the parts having circumferentially spaced generally radially outwardly extending clips, each including a resilient deflectable shouldered cover retaining portion, an interlocking portion, and a terminal to bear against said tire rim to cushion and back-up the shouldered portion, a wheel cover in overlying disposition of the wheel and having an annular dished portion including a radially outer annular flange portion having circumferentially spaced pressed out portions providing rearwardly opening pockets, said pockets each having adjacent thereto a retaining shoulder positioned in a common circle relative to one another, each capable of cooperation with at least one of said resilient deflectable shouldered cover retaining clip portions to maintain the cover on the wheel, at least one of the interlocking portions being lodged in one of said pockets to insure co-rotation, and each of said clip terminals bearing against said tire rim to cushion and backup said shouldered clip portion, said radially outer annular flange portion comprising an outer cover margin and including an intermediate annular back-up and reinforcing rib capable of bottomed engagement on said tire rim.

4. In a wheel structure including connected rim and body parts with one of the parts having a plurality of retaining clips thereon each including an attachment portion, a resiliently deflectable shouldered cover retaining portion, an interlocking portion, and a terminal portion to cushion and back-up the shouldered portion, a wheel cover in overlying disposition over the wheel and having an annular dished portion generally opposite the connection of rim and body parts and having circumferentially spaced openings, a plurality of said openings being centered with respect to said clips and with said clip resiliently deflectable shouldered portions in detachable retaining engagement therewith, with said interlocking clip portion in interlocked cooperation with edges of said openings to insure co-rotation, and with said terminal clip portions in backed-up cushioning engagement against one of said parts.

5. In a wheel structure including rim and body parts with one of the parts having circumferentially spaced generally radially outwardly extending clips, each including a resilient deflectable shouldered cover retaining portion, an interlocking portion, and a terminal to bear against said tire rim to cushion and back-up the shouldered portion, a wheel cover in overlying disposition of the wheel and having an annular dished portion including a radially outer annular flange portion having circumferentially spaced pressed out portions providing rearwardly opening pockets, said pockets each having adjacent thereto a retaining shoulder positioned in a common circle relative to one another, each cooperable with at least one of said resiliently deflectable shouldered cover retaining clip portions to maintain the cover on the wheel, at least one of the interlocking portions being lodged in each of said pockets to insure co-rotation, and each of said clip terminals against said tire rim to cushion and back-up said shouldered clip portion, each of said clips having a lead-in flange portion which is adapted to be progressively sprung by said retaining shoulder on said cover.

6. In a wheel structure including rim and body parts with one of the parts having circumferentially spaced generally radially outwardly extending clips, each including a resilient deflectable shouldered cover retaining portion, an interlocking portion, and a terminal to bear against said tire rim to cushion and back-up the shouldered portion, a wheel cover in overlying disposition of the wheel and having an annular dished portion including a radially outer annular flange portion having circumferentially spaced pressed out portions providing rearwardly opening pockets, said pockets each having adjacent thereto a retaining shoulder positioned in a common circle relative to one another, each capable of cooperation with at least one of said resiliently deflectable shouldered cover retaining clip portions to maintain the cover on the wheel, at least one of the interlocking portions being lodged in one of said pockets to insure co-rotation, and each of said clip terminals bearing against said tire rim to cushion and back-up said shouldered clip portion, each of said clip terminals including a biting edge for engagement against said tire rim.

7. In a wheel structure including connected rim and body parts with one of the parts having retaining clips thereon each including an attachment portion bottomed against both of said parts, a shouldered cover retaining portion, a generally radially and axially extending interlocking portion terminating in a biting gripping edge to enable the radially and axially extending portion to cushion and back-up the shoulder portion, a wheel cover in overlying disposition over the wheel and having an annular deeply dished portion generally opposite the connection of said rim and body parts and having circumferentially spaced pressed out portions providing rearwardly opening pockets, at least one of said pockets being centered with respect to said clip and with said clip shouldered portion in detachable retained engagement therewith with said radially and axially extending interlocking portion in interlocked cooperation with said pocket to insure co-rotation, and with said terminal biting gripping edge in backed-up cushioned engagement against one of said parts.

8. In a wheel structure including connected rim and body parts with one of the parts having retaining clips thereon each including an attachment portion, a shouldered cover retaining portion, an interlocking portion connected to said shoulder portion, a generally axially extending flange portion connected at one end to said interlocking portion and having a generally radially extending flange portion terminating in a gripping biting edge at the other end to cushion and back-up the shouldered portion, a wheel cover in overlying disposition over the wheel and having an annular deeply dished portion generally opposite the connection of said rim and body parts and having circumferentially spaced pressed out portions providing rearwardly opening pockets, at least one of said pockets being centered with respect to said clip and with said clip shouldered portion in detachable retained engagement therewith, with said interlocking clip portion in interlocked cooperation with said pocket to insure co-rotation, and with said clip edge in biting gripping backed-up cushioning engagement against one of said parts.

9. In a wheel structure including rim and body parts with one of the parts having circumferentially spaced generally radially outwardly extending clips, each including a resiliently deflectable cover retaining portion substantially spaced from the wheel permitting the retaining portion to freely deflect, said retaining portion having a generally axially rearwardly facing shoulder on a radially inner side of the clip, an interlocking portion, and a generally radially outwardly extending terminal to bear against the tire rim to cushion and back-up the shouldered portion.

10. In a wheel structure including wheel body and tire rim members, one of said members having retaining spring clip means extending generally axially outwardly therefrom and having cover retaining legs thereon, a cover for disposition at the outer side of the wheel, said cover being dished and having a base portion at the bottom of the dish and including converging cover portions merging with the base portion, one of said converging cover portions having radially opening circumferentially spaced clip receiving pockets therein which are arranged in a common circle and with shoulder means at said pockets for snap-on pry-off engagement by the clip legs with the base portion positioned axially rearwardly of the engagement between the legs and the shoulder means, the pockets being defined by wall portions cooperative with the clips to hold the cover against turning on the wheel.

11. In a wheel structure including wheel body and tire rim members, one of said members having retaining spring clip means extending generally radially and axially outwardly therefrom and having cover retaining legs thereon, each clip including a resilient deflectable shouldered cover retaining portion, and an interlocking portion, a cover for overlying disposition at the outer side of the wheel, said cover being dished and having a base portion at the bottom of the dish and including converging cover portions merging with the base portion, one of said converging portions having a series of radially opening circumferentially spaced clip receiving sockets therein which are arranged in a common circle and with shoulder means at said sockets for snap-on pry-off engagement by the shouldered cover retaining portions with the base portion of the cover positioned axially rearwardly of the engagement between the shouldered cover retaining portions and the shoulder means, the sockets being defined by wall portions cooperative with the clip interlocking portion to hold the cover against turning on the wheel.

12. In a wheel structure including connected rim and body parts with one of the parts having retaining clips thereon each including an attachment portion, a resiliently deflectable shouldered cover retaining portion, an interlocking portion, and a terminal portion to cushion and back-up the shouldered portion, a wheel cover in overlying disposition over the wheel and having an annular dished portion generally opposite the connection of rim and body parts and having circumferentially spaced openings, a plurality of said openings being centered with respect to said clips and with said clip resiliently deflectable shouldered portions in detachable retaining engagement therewith, with said interlocking clip portion in interlocked cooperation with an edge of said opening to insure co-rotation, and with said terminal clip portions in backed-up cushioning engagement against one of said parts, said shouldered portions being generally U-shaped in cross section and said dished cover portion having a series of correspondingly shaped radially extending ribs on the outer side of the cover nested thereover to conceal the shouldered portions.

References Cited in the file of this patent

UNITED STATES PATENTS 2,101,923    Stough _____ Dec. 14, 1937
2,491,501    Lyon _____ Dec. 20, 1949